(12) United States Patent
Keohane et al.

(10) Patent No.: US 8,244,974 B2
(45) Date of Patent: Aug. 14, 2012

(54) METHOD AND SYSTEM FOR EQUALIZING USAGE OF STORAGE MEDIA

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1463 days.

(21) Appl. No.: 10/732,625

(22) Filed: Dec. 10, 2003

(65) Prior Publication Data

US 2005/0132133 A1 Jun. 16, 2005

(51) Int. Cl.
*G06F 12/06* (2006.01)
(52) U.S. Cl. ............... 711/112; 711/E12.084; 711/161
(58) Field of Classification Search ............ 711/112, 711/100, 161, 162, 163, 111; 710/18
See application file for complete search history.

(56) References Cited

U.S. PATENT DOCUMENTS

| 5,726,937 | A | | 3/1998 | Beard ..................... 365/185.33 |
|---|---|---|---|---|
| 5,748,957 | A | | 5/1998 | Klein ............................. 395/652 |
| 5,909,691 | A | * | 6/1999 | Schultz et al. ..................... 711/4 |
| 5,951,700 | A | * | 9/1999 | Klein ............................... 714/47 |
| 5,961,613 | A | * | 10/1999 | DeNicola ......................... 710/18 |
| 6,081,447 | A | | 6/2000 | Lofgren et al. .......... 365/185.02 |
| 6,112,257 | A | * | 8/2000 | Mason et al. ..................... 710/18 |
| 6,230,233 | B1 | * | 5/2001 | Lofgren et al. ............... 711/103 |
| 6,237,063 | B1 | | 5/2001 | Bachmat et al. ............... 711/114 |
| 6,249,838 | B1 | | 6/2001 | Kon ............................... 711/103 |
| 6,366,987 | B1 | * | 4/2002 | Tzelnic et al. ................. 711/162 |
| 6,430,660 | B1 | | 8/2002 | Kemp et al. .................... 711/153 |
| 6,483,901 | B1 | * | 11/2002 | Cuallo ........................ 379/88.28 |
| 6,487,634 | B1 | | 11/2002 | Bachmat ....................... 711/112 |
| 6,611,896 | B1 | * | 8/2003 | Mason et al. .................. 711/114 |
| 6,748,487 | B1 | * | 6/2004 | Takamoto et al. ............. 711/113 |
| 6,954,833 | B1 | * | 10/2005 | Yochai et al. .................. 711/162 |
| 6,957,294 | B1 | * | 10/2005 | Saunders et al. .................. 711/4 |
| 6,985,996 | B1 | * | 1/2006 | Nagshain ...................... 711/114 |
| 2001/0027489 | A1 | * | 10/2001 | Miyamoto et al. ............ 709/238 |
| 2002/0069323 | A1 | * | 6/2002 | Percival ........................ 711/113 |
| 2004/0037034 | A1 | * | 2/2004 | Suzuki et al. ................. 361/687 |
| 2004/0162940 | A1 | * | 8/2004 | Yagisawa et al. ............. 711/114 |

OTHER PUBLICATIONS

Basham et al., U.S. Patent Application, "Stackable Connector System for Automated Removal/Addition in a Storage Media Library".

* cited by examiner

*Primary Examiner* — Edward Dudek, Jr.
*Assistant Examiner* — Ryan Dare
(74) *Attorney, Agent, or Firm* — Hamilton & Terrile, LLP; Stephen A. Terrile (57) ABSTRACT

A method is presented for using a hard disk drive which contains a non-volatile random access memory (NVRAM) and a computer-usable disk medium. A usage value is maintained for the number of accesses to the computer-usable disk medium, and the usage value is stored within the NVRAM. In a system that is connected to multiple hard disk drives, the usage values for the hard disk drives can be compared to determine a youngest disk drive or a lowest amount of usage amongst the multiple hard disk drives. When data needs to be mirrored or backed-up to one of the hard disk drives, it can be copied to the youngest or least-used hard disk drive. If an operating system installation needs to be performed, the operating system files can be stored on the youngest or least-used hard disk drive.

15 Claims, 5 Drawing Sheets

METHOD AND SYSTEM FOR EQUALIZING USAGE OF STORAGE MEDIA

BACKGROUND OF THE INVENTION

1. Field of the Invention

The present invention relates to an improved data digital processing system and, in particular, to a method and apparatus for input/output processing. Still more particularly, the present invention provides a method and apparatus for peripheral monitoring.

2. Description of Related Art

One of the most critical and used devices of a digital data processing system is the disk drive. Unfortunately, multiple disk drives within a computer system are often used in an unbalanced manner throughout the lifetime of the disk drives. For example, an unbalanced condition occurs when one disk drive is chosen for a particular operation, such as an installation of an operating system, due to configuration information or its physical location within the computer system, thereby resulting in the disk drive being used for reading and writing operations much more often than other equally capable disk drives. Hence, there is a higher likelihood that this disk drive will fail sooner than other disk drives in the computer system. This situation might cause system downtime to occur more often as one drive, over time, becomes a fail point for the computer system.

Therefore, it would be advantageous to have a method and a system for equalizing usage of multiple disk drives within a computer system.

SUMMARY OF THE INVENTION

A method is presented for using a hard disk drive which contains a non-volatile random access memory (NVRAM) and a computer-usable disk medium. A usage value is maintained for the number of accesses to the computer-usable disk medium, and the usage value is stored within the NVRAM. In a system that is connected to multiple hard disk drives, the usage values for the hard disk drives can be compared to determine a youngest disk drive or a lowest amount of usage amongst the multiple hard disk drives. When data needs to be mirrored or backed-up to one of the hard disk drives, it can be copied to the youngest or freshest hard disk drive. If an operating system installation needs to be performed, the operating system files can be stored on the youngest or least-used hard disk drive.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a data processing system is described prior to describing the present invention in more detail.

Figure 1A:
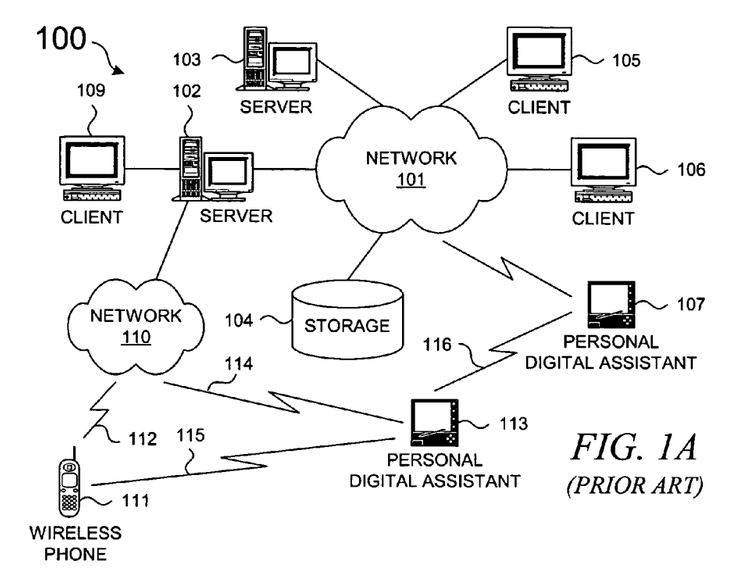
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented within a variety of hardware platforms; FIG. 1A is intended as an example of a heterogeneous computing environment and not as an architectural limitation for the present invention.

Figure 1B:
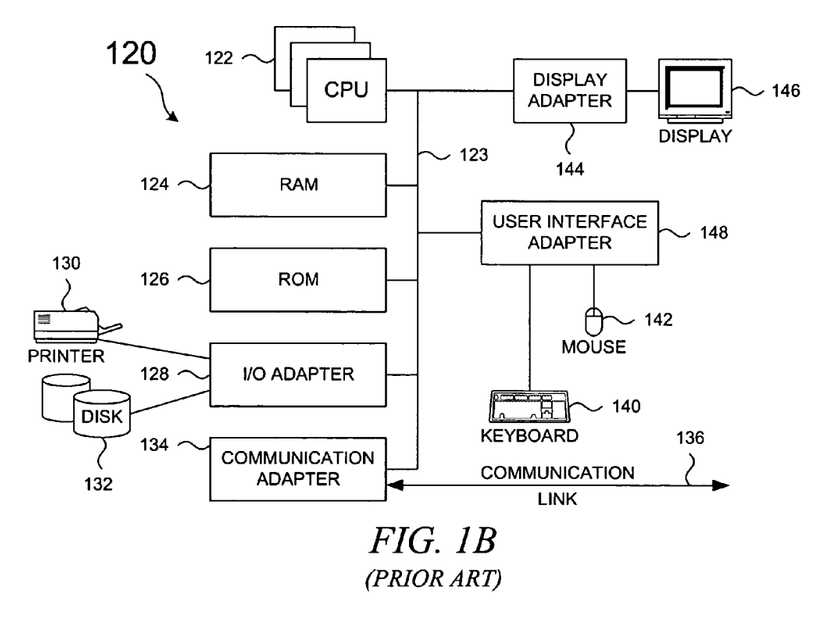
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B, including a symmetric multiprocessor (SMP) machine. Although all of the components that are shown within FIG. 1A and FIG. 1B may not be required by the present invention, these components may be used by software or hardware components that interface with the present invention. In addition, the present invention may be implemented in a computational environment in which various components, such as display devices, are used indirectly to support the present invention, e.g., to allow configuration or use of applications by a system administrator.

More specifically, though, the present invention is directed to an improved method and system for equalizing usage of multiple disk drives within a computer system. Prior to describing the improved usage technique in more detail, the use of a typical disk drive is illustrated.

Figure 2A:
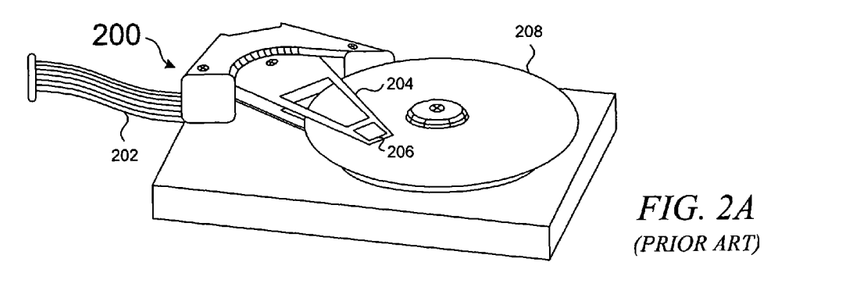
FIG. 2A depicts a typical hard disk drive (HDD) system.

With reference now to FIG. 2A, a typical hard disk drive (HDD) system is illustrated. Hard disk drive 200 receives data across host communication channel 202. A hard disk controller (HDC) controls an actuator that can move suspension arm 204 to any track of bits on the disk, from the inner to the outer diameter. Read/write head 206 at the end of suspension arm 204 reads and writes bits onto disk 208 by detecting or changing magnetic elements on the disk. Electronic circuits monitor the motion of the disk and head so its position over the disk is precisely known.

Figure 2B:
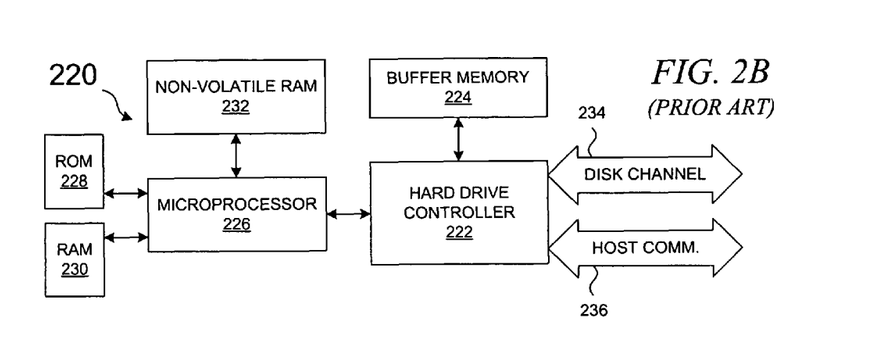
FIG. 2B depicts a block diagram of a set of typical components within a typical hard disk drive system.

With reference now to FIG. 2B, a block diagram illustrates a set of typical components within a typical hard disk drive system. Hard disk drive system 220 contains hard disk controller 222, buffer memory 224, microprocessor 226, read-only memory (ROM) 228, random access memory (RAM) 230, and non-volatile RAM 232. Buffer memory 224 may be used to cache data by hard disk controller 222 and for various direct memory access functions supported by hard disk controller 222 that are accessible from the host system. ROM 228 may support an instruction memory for microprocessor 226. RAM 230 provides microprocessor 230 with temporary data storage that may be used by a control program from ROM 228 while it is executing on microprocessor 230. Non-volatile RAM (NVRAM) 232 may be any form of RAM for reading and writing data that maintains data values in a power-off state, i.e., in a non-volatile manner, such as flash-type memories.

Disk channel path 234 is a data path by which data is written to and recovered from a physical disk medium, such as disk 208 in FIG. 2A. Host communications path 236 is the interface for the hard disk drive system and the host system, such as a personal computer or some other type of data processing system. Requests for access to buffer 224, ROM 228, RAM 230, or NVRAM 232 of hard disk drive system 220 may originate from three sources: hard disk controller 222 via hard-coded control circuits or stored microcode; microprocessor 226 via execution of HDD control programs; and host communication path 234 via hardware or software in the host system.

Figure 2C:
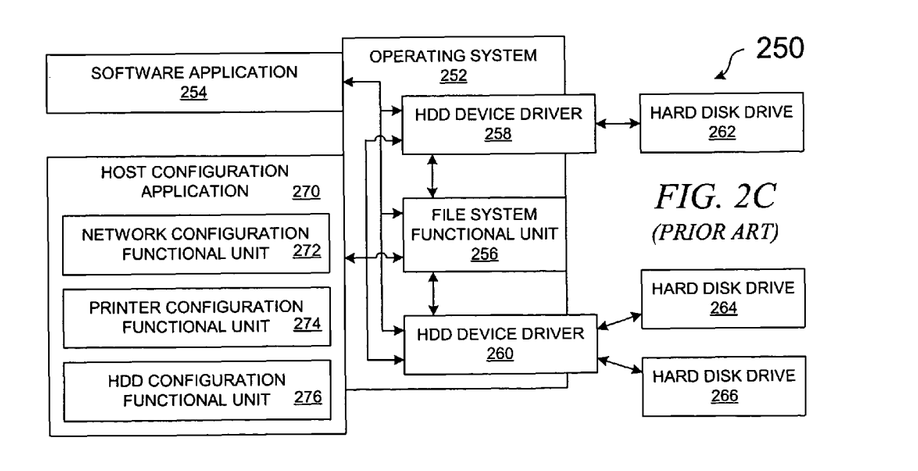
FIG. 2C depicts a block diagram that shows a set of typical components within a typical host system.

With reference now to FIG. 2C, a block diagram illustrates a set of typical components within a typical host system. Host system 250 includes operating system 252 for executing software on host system 250, such as software application 254, and for controlling hardware components on host system 250; e.g., host system 250 may be one of the systems that are shown in FIG. 1A. Software application 254 can modify files by calling file input/output functions within file system functional unit 256 in operating system 252; alternatively, software application 254 can modify files more directly at a lower device level by calling input/output functions within hard disk drive device driver 258 and hard disk drive device driver 260.

Assuming that software application 254 calls a function within file system functional unit 256 for modifying a target file, file system functional unit 256 may invoke functions within hard disk drive device drivers that are supported by operating system 252 if the target file is stored on host system 250; otherwise, file system functional unit 256 may invoke various network-related functions to access the target file if it is remotely stored. In the example that is shown in FIG. 2C, host system 250 supports multiple types of hard disk drives. Hard disk driver 258 is registered with operating system 252 for controlling a first type of hard disk drive; hard disk drive 262 represents an instance of the first type of hard disk drive. Similarly, hard disk driver 260 is registered with operating system 252 for controlling a second type of hard disk drive; hard disk drive 264 and hard disk drive 266 represent two instances of the second type of hard disk drive. Hard disk drives 262-266 may be similar to hard disk drives 200 or 220 in FIGS. 2A and 2B, respectively.

Host system 250 also includes host configuration application 270 for allowing a system administrator or some other type of privileged user to configure host system 250. In the example that is shown in FIG. 2C, host configuration application 270 includes: network configuration functional unit 272, e.g., for configuring a network card or some other type of communication device; printer configuration functional unit 274, e.g., for configuring a default printer among multiple printers or for setting other print-related parameters; and hard disk drive configuration functional unit 276. For example, in a data processing system that includes multiple hard disk drives, such as host system 250, a hard disk drive configuration functional unit may allow a system administrator to select a primary drive and a backup drive among multiple hard disk drives or to perform other HDD-related configuration tasks.

Turning now to the present invention, an improved method and system for equalizing usage of multiple disk drives within a computer system is presented. The present invention is directed to a method and system for monitoring hard disk drive usage so that a system administrator or other user may rotate hard disk drive usage amongst multiple disk drives on a computer system, as explained in more detail further below.

Figure 3:
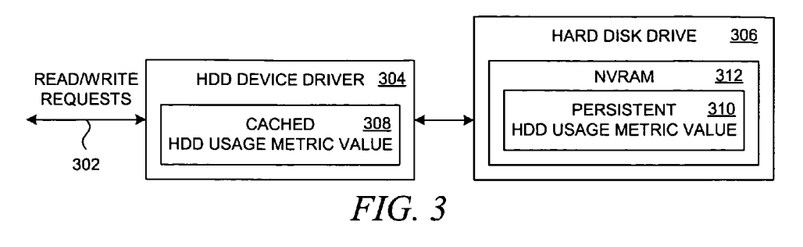
FIG. 3 depicts a block diagram that shows some components in a host system that may be used to monitor hard disk drive usage in accordance with an embodiment of the present invention.

With reference now to FIG. 3, a block diagram illustrates some components in a host system that may be used to monitor hard disk drive usage in accordance with an embodiment of the present invention. As read/write requests 302 are received by HDD device driver 304, e.g., in the form of commands or function calls, device driver 304 maintains a count or running total of all read/write requests that are issued to a particular hard disk drive, such as hard disk drive 306. In FIG. 3, cached HDD usage metric value 308 represents a running total of the reads/writes for hard disk drive 306; if HDD device driver 304 supports more than one hard disk drive, such as HDD device driver 260 that is shown in FIG. 2C, then the HDD device driver would cache a HDD usage metric value for each supported hard disk drive. At certain times or system checkpoints, HDD device driver 304 stores cached HDD usage metric value 308 as persistent HDD usage metric value 310 in NVRAM 312 of hard disk drive 306; at other points in time, HDD device driver 304 reads persistent HDD usage metric value 310 from NVRAM 312 of hard disk drive 306, as explained in more detail further below.

Figure 4:
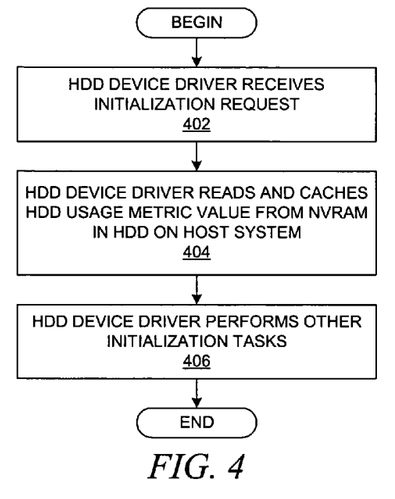
FIG. 4 depicts a flowchart that shows a process for initializing a HDD device driver with respect to a HDD usage metric value.

With reference now to FIG. 4, a flowchart illustrates a process for initializing a HDD device driver with respect to a HDD usage metric value. The process begins with the HDD device driver receiving an initialization request (step 402). The initialization request may originate within the operating system of a host system; for example, during a power-on, startup, or restart process on a host computer, the operating system on the host computer may ensure that its device drivers are initialized and are responding to commands or function calls before beginning or resuming execution of software applications. Alternatively, the operating system may initiate the execution of the HDD device driver during a power-on, startup, or restart process on a host computer, and the HDD device driver may then initiate its own initialization process.

Prior to executing the steps that are shown in the flowchart of FIG. 4, it may be assumed that the hard disk drives on the host system have been initialized, e.g., by completing a power-on self-test (POST) process under the control of a BIOS on the host system. The hard disk drives are then able to respond to commands from the host system. It may also be assumed that the NVRAM in a hard disk drive was reset or cleared upon manufacture and/or that the NVRAM in a hard disk drive can be reset or cleared upon the execution of special instructions or upon the completion of a particular hardware configuration operation, such as pushing a special reset button on the hard disk drive device. In any case, an HDD device driver may use the values in the NVRAM of the hard disk drive with the assumption that the stored values are not garbage values and that they correctly represent certain quantities.

In any case, as part of its initialization procedure, the HDD device driver reads and caches a HDD usage metric value from the NVRAM in a supported hard disk drive on the host system (step 404). By retrieving the persistently stored HDD usage metric value from each supported hard disk drive, the HDD device driver initializes its count of the read/write operations for each supported hard disk drive. The HDD device driver then performs other initialization tasks (step 406), and the process is concluded.

Figure 5:
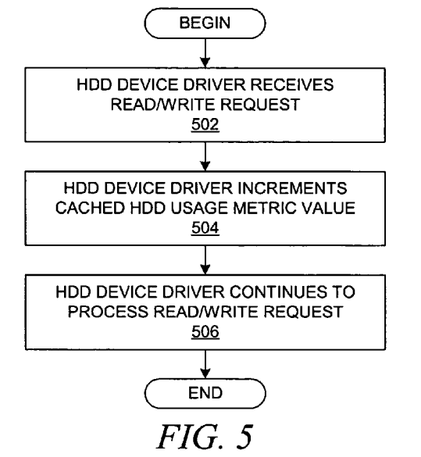
FIG. 5 depicts a flowchart that shows a process for maintaining a HDD usage metric value within a HDD device driver.

With reference now to FIG. 5, a flowchart illustrates a process for maintaining a HDD usage metric value within a HDD device driver. The process begins when a HDD device driver receives a read request or a write request to a particular hard disk drive (step 502). At some point during the processing of the read/write request, the HDD device driver retrieves, increments, and stores its cached HDD usage metric value for that particular hard disk drive (step 504). Although the HDD usage metric value may be assumed to be incremented by one, the HDD usage metric value may be only arithmetically related to the number of operations that one monitors as part of the usage of a hard disk drive. For example, the HDD usage metric value may be incremented by some other integer value that depends on the number of operations that one monitors as part of the usage of a hard disk drive.

The HDD device driver then continues to support the read/write request (step 506), and the process is concluded. It should be noted that the examples herein describe the maintenance of running counts for reads and writes to a hard disk drive; alternatively, additional HDD operations or other HDD operations may be counted as part of the representation of a usage metric on the hard disk drive, such as seek operations.

Figure 6:
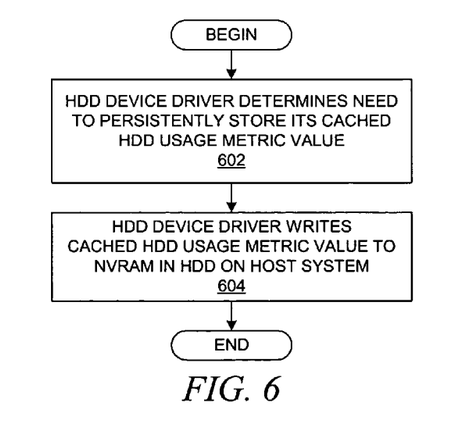
FIG. 6 depicts a flowchart that shows a process for maintaining a HDD usage metric value within a hard disk drive.

With reference now to FIG. 6, a flowchart illustrates a process for maintaining a HDD usage metric value within a hard disk drive. The process begins when the HDD device driver determines that it needs to persistently store the cached HDD usage metric value for a particular hard disk drive (step 602). For example, the HDD device driver may receive a terminate request from the operating system on the host system, thereby informing the HDD device driver that the host system is shutting down, powering off, entering a suspended/sleep state, or performing some type of action that requires safeguarding the integrity of the system. Alternatively, the HDD device driver may periodically perform checkpoint tasks, or the HDD device driver may use periods of inactivity or idle periods of the hard disk drive to perform certain management tasks. In any case, the HDD device driver writes the cached HDD usage metric value to the NVRAM in the particular hard disk drive device (step 604), thereby checkpointing the HDD usage metric value, and the process is concluded. If necessary, the HDD device driver repeats this process for each of its supported hard disk drives on the host system.

Taken together, FIGS. 4-6 depict a manner for maintaining a count of the number of read/write operations (or any other HDD operation or combination of HDD operations that may be used as an HDD usage metric value) to a hard disk drive over the lifetime of the hard disk drive. The NVRAM in the hard disk drive is used to persistently store the HDD usage metric value over the lifetime of the hard disk drive, which is useful for other administrative operations that may be performed on the hard disk drive, as explained in more detail further below. Although FIG. 5 and FIG. 6 depict a process in which a device driver increments the HDD usage metric value and stores the incremented HDD usage metric value within the NVRAM of a hard disk drive, these operations may be performed within the hard disk drive, e.g., by microprocessor 226 via execution of HDD control programs.

Figure 7:
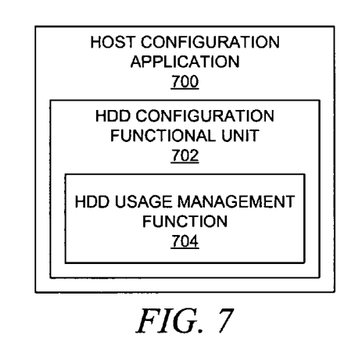
FIG. 7 depicts a block diagram that shows a host configuration application that includes enhanced functionality for managing HDD usage in accordance with an embodiment of the present invention.

With reference now to FIG. 7, a block diagram illustrates a host configuration application that includes enhanced functionality for managing HDD usage in accordance with an embodiment of the present invention. Host configuration application 700 and HDD configuration functional unit 702 are similar to host configuration application 270 and HDD configuration functional unit 276 that are shown in FIG. 2C. However, HDD configuration functional unit 702 has been enhanced to include additional functionality, i.e., HDD usage management function 704, for managing and using HDD usage metric values as maintained by the processes that were described above with respect to FIGS. 4-6.

Figure 8:
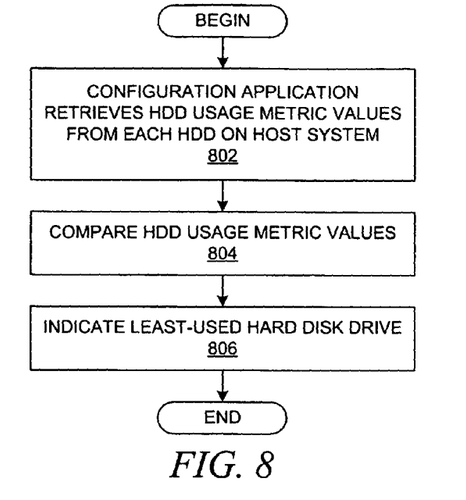
FIG. 8 depicts a flowchart that shows a process by which an enhanced host configuration application uses HDD usage metric values associated with multiple hard disk drives in a host system.

With reference now to FIG. 8, a flowchart illustrates a process by which an enhanced host configuration application uses HDD usage metric values associated with multiple hard disk drives in a host system in accordance with the present invention. The process commences when a configuration application retrieves HDD usage metric values from each hard disk drive on the host system (step 802), e.g., via HDD usage management function 704 that is shown in FIG. 7. For example, a system administrator may be employing an HDD configuration application or a host configuration application to install a hard disk drive on the host system or to reconfigure the host system in some manner that involves the hard disk drives. Hence, a user of the host system has initiated an operation within an application that requires the HDD usage metric values, which are then compared with each other (step 804); the comparison may comprise a sort operation. The least-used hard disk drive, which would correspond to the lowest HDD usage metric value among the set of HDD usage metric values, is then indicated in some manner within the application (step 806), and the process is concluded. For example, the least-used hard disk drive may be graphically emphasized with a special color or in some other manner within a graphical user interface that is presented on a display device.

In an alternative embodiment, after the HDD usage metric values have been compared, all of the HDD usage metric values are presented in some manner in accordance with the result of the comparison with the other HDD usage metric values. For example, the HDD usage metric values could be shown in ascending order, descending order, or in some other manner. As alternative processing or as additional processing, more complex mathematical operations and/or comparisons may also be performed, as shown below with respect to FIG. 9.

The user of the application may select one of the hard disk drives for a particular configuration operation within the software application with knowledge of the HDD usage metric values that have been presented within a graphical user interface window. For example, a system administrator (or a user within control over configuring the host system) may desire to configure one of the hard disk drives on the host system as the default hard drive from which the operating system is loaded or from which most software applications are loaded. In order to circumvent or minimize future hard disk drive failures, the system administrator may desire to select the hard disk drive that has the least amount of usage among the hard disk drives on the host system. Using the present invention, the system administrator would be able to select the hard disk drive with the least amount of usage. Although the example that is shown in FIG. 8 assumes that a user employs the HDD usage metric information in order to determine an appropriate operation to be performed with respect to the HDD usage metric information, the present invention may be employed in conjunction with an automatic operation that does not require interaction with a user, as is illustrated in an example hereinbelow with respect to FIG. 10.

Figure 9:
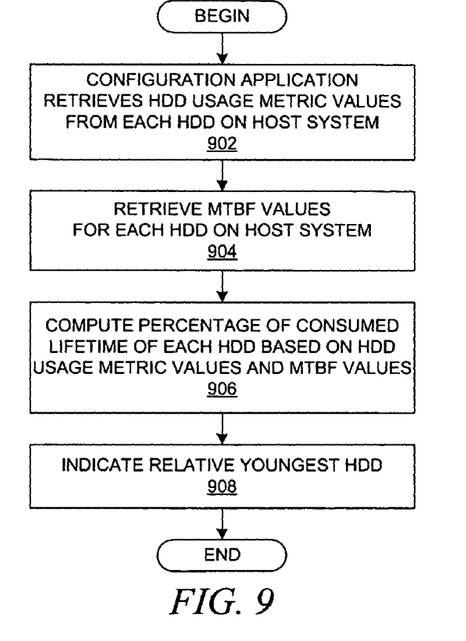
FIG. 9 depicts a flowchart that shows a process by which an enhanced configuration application uses HDD usage metric values and mean-time-between-failure (MTBF) values associated with multiple hard disk.

With reference now to FIG. 9, a flowchart illustrates a process by which an enhanced configuration application uses HDD usage metric values and mean-time-between-failure (MTBF) values associated with multiple hard disk drives in a system in accordance with the present invention. The process commences when a configuration application retrieves HDD usage metric values from each hard disk drive on a host system (step 902). In addition, the configuration application retrieves mean-time-between-failure (MTBF) values for each hard disk drive (step 904). For example, the software application may access a database or a configuration file that provides information about the MTBF values for various types of hard disk drives. Alternatively, an MTBF value may be stored in the ROM of each hard disk drive, such as ROM 228 that is shown in FIG. 2B.

The configuration application then computes a consumed lifetime value for each hard disk drive (step 906). An MTBF value for a particular type of hard disk drive reflects the average lifespan for that type of hard disk drive; in addition, a given hard disk drive's HDD usage metric value reflects the wear and tear that has been imposed on the hard disk drive through the read/write and/or other operations on the hard disk drive. Hence, the consumed lifetime value for a particular hard disk drive is related to the percentage of the average lifespan that has already been consumed for that particular hard disk drive as indicated by its HDD usage metric value. The consumed lifetime values for the hard disk drives are then compared with each other to determine and then indicate the relatively youngest hard disk drive (step 908), and the process is concluded. For example, the relatively youngest hard disk drive may be graphically emphasized with a special color or in some other manner within a graphical user interface. Alternatively, after the relative ages of the hard disk drives have been computed and compared, all of the relative ages may be presented in accordance with the result of the comparison.

A given type of hard disk drive may be built more robustly and have a higher MTBF value than another type of hard disk drive. Hence, it is possible for a first hard disk drive to have a larger HDD usage metric value than a second hard disk drive and, at the same time, for the first hard disk drive to be relatively younger than the second hard disk drive because the first hard disk drive has a larger MTBF value than the second hard disk drive. In this manner, relative age of a hard disk drive is determined from its previous usage and its expected future lifetime.

Figure 10:
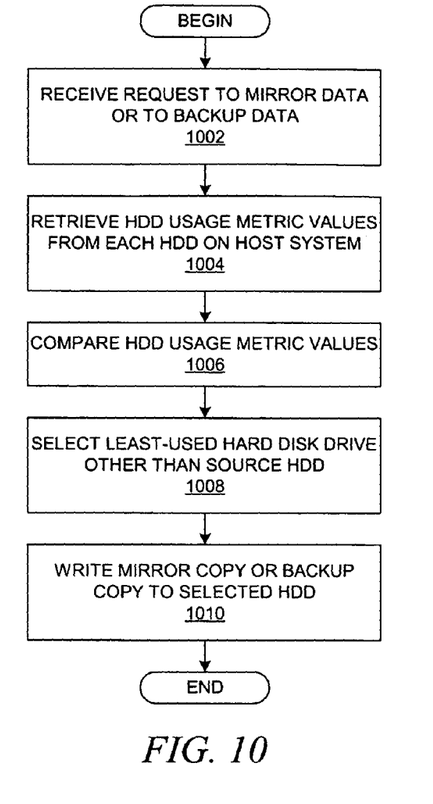
FIG. 10 depicts a flowchart that shows a process for data mirroring or data backup based on HDD usage metric values associated with multiple hard disk drives.

With reference now to FIG. 10, a flowchart illustrates a process for data mirroring or data backup based on HDD usage metric values associated with multiple hard disk drives in a host system in accordance with the present invention. In contrast with the examples that are described with respect to FIG. 8 and FIG. 9, the example of an embodiment of the present invention that is described with respect to FIG. 10 involves an automatic or programmatic operation in which user intervention or user interaction is not required.

The process commences with the receipt of a request to mirror data or to backup data within a host system (step 1002) by some type of software application that contains functionality for mirroring data or for archiving data; the request may be in the form of a function call, a request message, or some other format. HDD usage metric values are retrieved from each hard disk drive on the host system (step 1004), e.g., via HDD usage management function 704 that is shown in FIG. 7, and the HDD usage metric values are compared to each other (step 1006). As determined in accordance with the HDD usage metric values, the hard disk drive that has the least amount of usage is then selected for the target hard disk drive for storing the mirrored data or the backed-up data (step 1008); if the source location for the origination of the data is one of the hard disk drives within the host system, then the process may ensure that the source hard disk drive and the target hard disk drive are not identical, e.g., by selecting the hard disk drive that has the second-least amount of usage. The mirror copy of the backup copy of the data is then written to the selected hard disk drive (step 1010), and the process is concluded.

Figure 11:
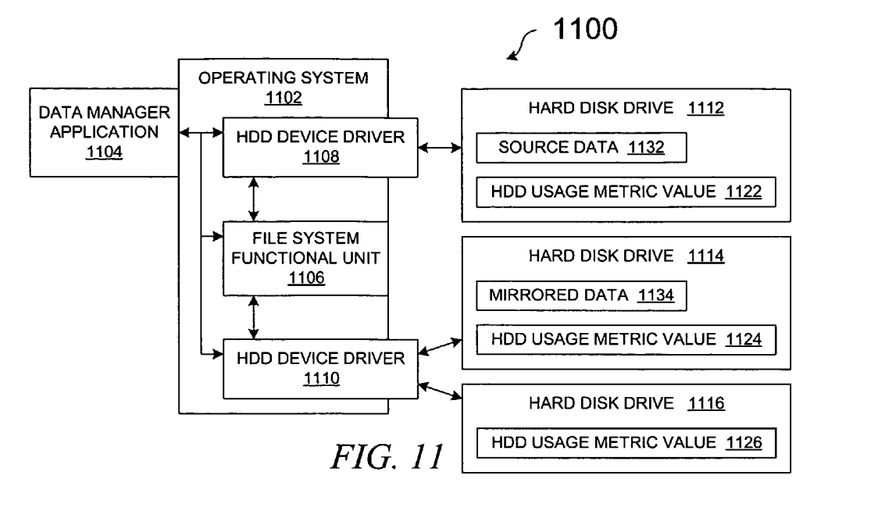
FIG. 11 depicts a block diagram that shows an example of a data management application that creates a mirrored copy of data using an embodiment of the present invention.

With reference now to FIG. 11, a block diagram illustrates an example of a data management application that creates a mirrored copy of data using an embodiment of the present invention. In a manner similar to that shown in FIG. 2C, host system 1100 includes operating system 1102 for executing software on host system 1100, such as data management application 1104, and for controlling hardware components on host system 1100. Data management application 1104 can modify files by calling file input/output functions within file system functional unit 1106 in operating system 1102; alternatively, data management application 1104 can modify files more directly at a lower device level by calling input/output functions within hard disk drive device driver 1108 and hard disk drive device driver 1110. File system functional unit 1106 may also invoke functions within the hard disk drive device drivers that are supported by operating system 1102.

In contrast to the system that is shown in FIG. 2C, host system 1100 supports multiple hard disk drives 1112, 1114, and 1116, each of which maintain an HDD usage metric value in a manner as described above in accordance with the present invention, such as HDD usage metric values 1122, 1124, and 1126, respectively. As described above with respect to the process that is shown in FIG. 10, e.g., possibly in response to a request or a scheduled periodic operation, data management application 1104 determines that it needs to create a mirrored copy of source data 1132 on a hard disk drive other than hard disk drive 1112 on which source data 1132 is currently stored. With the present invention, data management application 1104 compares HDD usage metric values 1124 and 1126 from hard disk drives 1114 and 1116, respectively, and selects hard disk drive 1114 as the destination of mirrored data 1134 based on some criteria that is used as the evaluation function, e.g., based on the absolute lesser amount of usage of hard disk drive 1114, i.e., least-used hard disk drive, or on the relative youth of hard disk drive 1114 that depends on the amount of usage of hard disk drive 1114 and its MTBF value.

Figure 12:
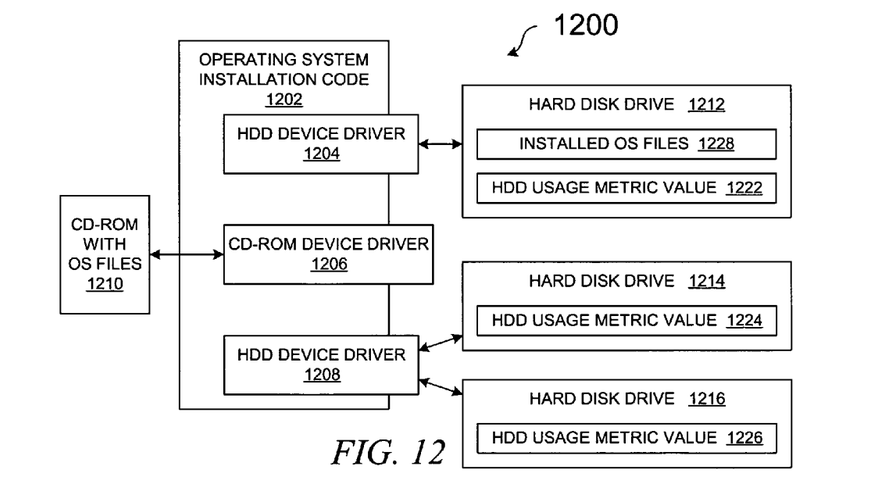
FIG. 12 depicts a block diagram that shows an example of an operating system installation function or application that installs an operating system while employing an embodiment of the present invention.

With reference now to FIG. 12, a block diagram illustrates an example of an operating system installation function or application that installs an operating system while employing an embodiment of the present invention. In contrast to the example that is shown in FIG. 11, host system 1200 includes operating system installation code 1202 for installing an operating system on host system 1200. Operating system installation code 1202 comprises code for booting host system 1200, e.g., from a floppy drive with assistance from a pre-installed BIOS in host system 1200.

The goal of operating system installation code 1202 is to load an operating system onto one of the available hard disk drives that are connected to host system 1200. Since an operating system has not yet been installed on host system 1200, operating system installation code 1202 also comprises drivers for accessing various input/output devices, such as drivers 1204-1208. Operating system installation code 1202 uses CD-ROM device driver 1206 to read CD-ROM 1210 that stores the files that contain the executable code for the operating system. Operating system installation code 1202 uses HDD device driver 1204 to access hard disk drive 1212 or HDD device driver 1208 to access either hard disk drive 1214 or hard disk drive 1216.

Operating system installation code 1202 is able to select one of hard disk drives 1212-1216 as the default location for the operating system files; using the present invention, operating system installation code 1202 is able to perform the selection based on HDD usage metric values 1222-1226 in the hard disk drives. If the hard disk drive is newly manufactured and is unused, then the HDD usage metric value in a given hard disk drive may be an initialization value; if the given hard disk drive has already been used, possibly in another host system, then the HDD usage metric value in the given hard disk drive may show substantial age or use. In any case, the selection operation may be based on a comparison of the absolute HDD usage metric values, or the selection may be accomplished in accordance with some other function, such as a comparison of the relative ages of the hard disk drives based on their HDD usage metric values and their MTBF values. In this example, operating system installation code 1202 has selected hard disk drive 1212 and has placed installed OS files 1228 on hard disk drive 1212. After the installation process has been completed, then hard disk drive 1212 may be configured as the boot-up device within a BIOS of host system 1200.

The advantages of the present invention should be apparent in view of the detailed description of the invention that is provided above. The present invention allows a user to spread out HDD usage within a system over the lifetime of all of the hard disk drives in the system. If desired by a user that is configuring a system, a new hard disk drive that is added to the system can be configured to be used before re-using older hard disk drives, thus extending the lifespan of older hard disk drives. The spread of the usage should also allow the hard disk drives to reach their published average lifetimes as indicated by the MTBF values associated with the hard disk drives. In addition, if a hard disk drive does fail, an engineer may use the HDD usage metric values for general statistical purposes or during an error analysis process to determine if the estimates of the MTBF values were accurate.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for using a plurality of hard disk drives that are connected to a data processing system, each of the hard disk drives including a non-volatile random access memory (NVRAM) and a computer-usable disk medium, the method comprising:
    reading a plurality of usage values from each of the plurality of hard disk drives, wherein a usage value for a hard disk drive is stored within an NVRAM of the hard disk drive, and wherein a usage value is related to a count of accesses to a computer-usable disk medium of the hard disk drive;
    comparing the plurality of usage values;
    determining to install operating system files on a hard disk drive within the plurality of hard disk drives;
    selecting a hard disk drive amongst the plurality of hard disk drives based on the plurality of usage values; and
    installing the operating system files to the selected hard disk drive.

2. The method of claim 1 further comprising:
    determining a lowest usage value amongst the plurality of usage values; and
    indicating the lowest usage value and its associated hard disk drive to a user of the data processing system.

3. The method of claim 1 further comprising:
    retrieving a plurality of mean-time-between-failures (MTBF) values associated with the plurality of hard disk drives; and
    computing a consumed lifetime value based on a usage value and a MTBF value for each of the plurality of hard disk drives.

4. The method of claim 3 further comprising:
    determining a lowest consumed lifetime value amongst the plurality of consumed lifetime values; and
    indicating the lowest consumed lifetime value and its associated hard disk drive to a user of the data processing system.

5. The method of claim 1 further comprising:
    determining to copy data to a hard disk drive within the plurality of hard disk drives;
    selecting a hard disk drive amongst the plurality of hard disk drives based on the plurality of usage values; and
    copying data to the selected hard disk drive.

6. A computer program product on a non-transitory computer-readable medium for use in a data processing system for using a plurality of hard disk drives that are connected to a data processing system, each of the hard disk drives including a non-volatile random access memory (NVRAM) and a computer-usable disk medium, the computer program product comprising:
    means for reading a plurality of usage values from each of the plurality of hard disk drives, wherein a usage value for a hard disk drive is stored within an NVRAM of the hard disk drive, and wherein a usage value is related to a count of accesses to a computer-usable disk medium of the hard disk drive; and
    means for comparing the plurality of usage values;
    means for determining to install operating system files on a hard disk drive within the plurality of hard disk drives;
    means for selecting a hard disk drive amongst the plurality of hard disk drives based on the plurality of usage values; and
    means for installing the operating system files to the selected hard disk drive.

7. The computer program product of claim 6 further comprising:
    means for determining a lowest usage value amongst the plurality of usage values; and
    means for indicating the lowest usage value and its associated hard disk drive to a user of the data processing system.

8. The computer program product of claim 6 further comprising:
    means for retrieving a plurality of mean-time-between-failures (MTBF) values associated with the plurality of hard disk drives; and
    means for computing a consumed lifetime value based on a usage value and a MTBF value for each of the plurality of hard disk drives.

9. The computer program product of claim 8 further comprising:
    means for determining a lowest consumed lifetime value amongst the plurality of consumed lifetime values; and
    means for indicating the lowest consumed lifetime value and its associated hard disk drive to a user of the data processing system.

10. The computer program product of claim 6 further comprising:
    means for determining to copy data to a hard disk drive within the plurality of hard disk drives;
    means for selecting a hard disk drive amongst the plurality of hard disk drives based on the plurality of usage values; and
    means for copying data to the selected hard disk drive.

11. An apparatus for using a plurality of hard disk drives that are connected to a data processing system, each of the hard disk drives including a non-volatile random access memory (NVRAM) and a computer-usable disk medium, the apparatus comprising:
    means for reading a plurality of usage values from each of the plurality of hard disk drives, wherein a usage value for a hard disk drive is stored within an NVRAM of the hard disk drive, and wherein a usage value is related to a count of accesses to a computer-usable disk medium of the hard disk drive; and
    means for comparing the plurality of usage values;
    means for determining to install operating system files on a hard disk drive within the plurality of hard disk drives;
    means for selecting a hard disk drive amongst the plurality of hard disk drives based on the plurality of usage values; and
    means for installing the operating system files to the selected hard disk drive.

12. The apparatus of claim 11 further comprising:
    means for determining a lowest usage value amongst the plurality of usage values; and
    means for indicating the lowest usage value and its associated hard disk drive to a user of the data processing system.

13. The apparatus of claim 11 further comprising:

means for retrieving a plurality of mean-time-between-failures (MTBF) values associated with the plurality of hard disk drives; and means for computing a consumed lifetime value based on a usage value and a MTBF value for each of the plurality of hard disk drives.

14. The apparatus of claim 13 further comprising:

means for determining a lowest consumed lifetime value amongst the plurality of consumed lifetime values; and means for indicating the lowest consumed lifetime value and its associated hard disk drive to a user of the data processing system.

15. The apparatus of claim 11 further comprising:

means for determining to copy data to a hard disk drive within the plurality of hard disk drives;

means for selecting a hard disk drive amongst the plurality of hard disk drives based on the plurality of usage values; and means for copying data to the selected hard disk drive.

* * * * *